Oct. 25, 1966     P. BELIVEAU     3,281,741
MAGNETIC LEAK RELAY
Filed Jan. 29, 1964     2 Sheets-Sheet 1
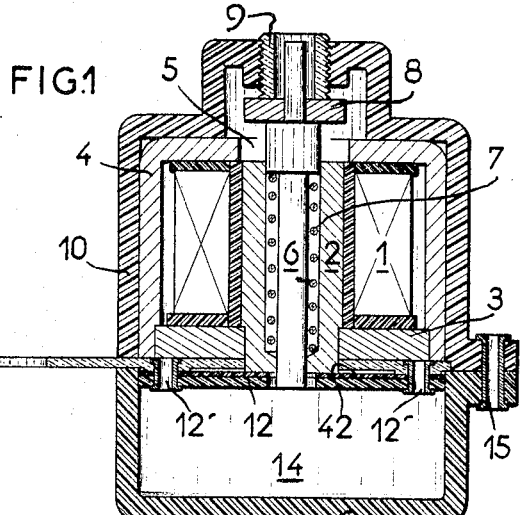
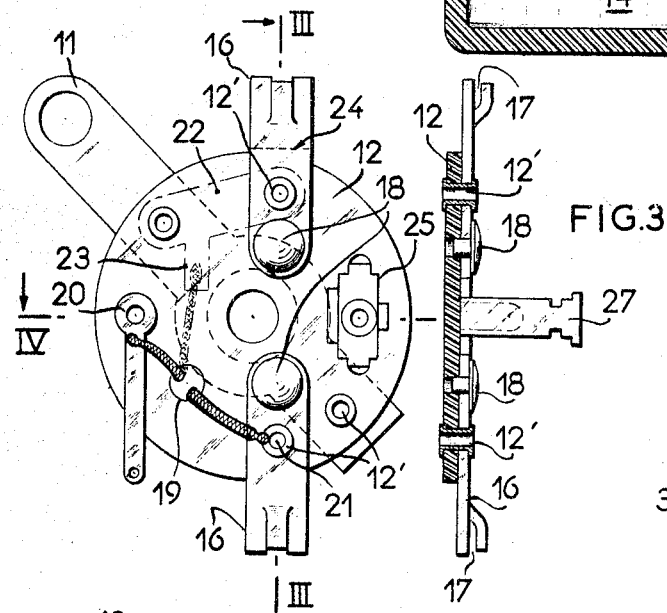
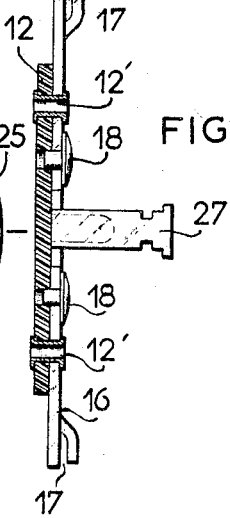
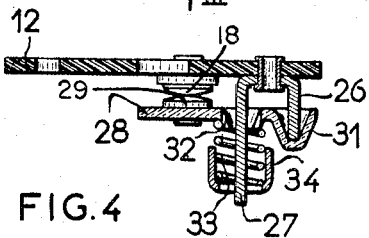
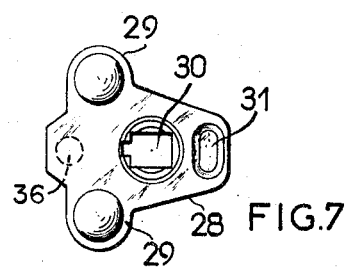
INVENTOR.
PAUL BELIVEAU
BY
Bacon & Thomas
ATTORNEYS Oct. 25, 1966  P. BELIVEAU  3,281,741
MAGNETIC LEAK RELAY
Filed Jan. 29, 1964  2 Sheets-Sheet 2
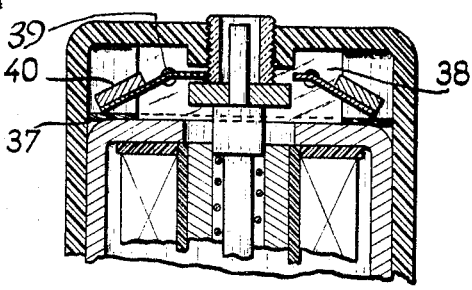
FIG.8
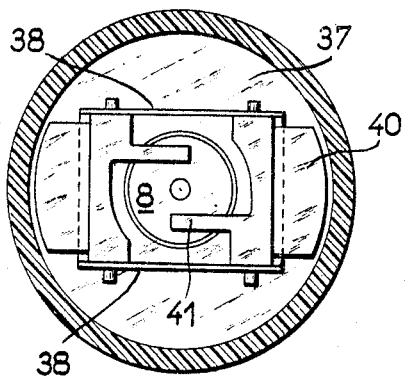
FIG.9
FIG.10  FIG.11
110V.  220V.
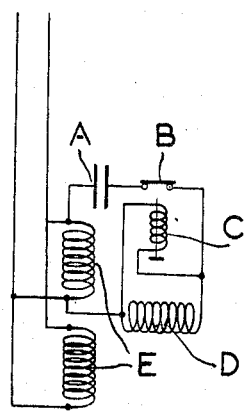 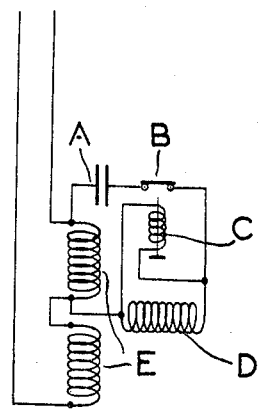
INVENTOR.
PAUL BELIVEAU
BY
Bacon & Thomas
ATTORNEYS

United States Patent Office 3,281,741
Patented Oct. 25, 1966

3,281,741
MAGNETIC LEAK RELAY
Paul Beliveau, Vouvant (Vendée), France
Filed Jan. 29, 1964, Ser. No. 340,868
Claims priority, application France, Feb. 6, 1963,
923,917
3 Claims. (Cl. 335—258)

The present invention has for its object a relay which makes it possible to obtain a substantial voltage difference between actuation and release, said relay being especially designed for the purpose of automatically cutting out of circuit the starting capacitors of single-phase motors.

In order to make a single-phase motor self-starting, provision is usually made for an auxiliary winding which is supplied with current at the moment of starting through a capacitor which can be of the electro-chemical type, for example.

As soon as the speed of the motor has reached a predetermined value (synchronization speed), the above-mentioned auxiliary winding is usually disconnected from the circuit by means of a cutout switch operated by centrifugal force.

The high price of control devices of this type as well as the small speed margin covered by each device have induced manufacturers to seek less costly solutions. Accordingly, units of highly simplified design have been developed but are unreliable in operation and cannot readily be repaired or serviced on account of the fact that they are located in the interior of the motor casing.

The main object of the present invention is to overcome the disadvantages referred to above. To this end, the invention is concerned with a magnetic leak relay which is characterized in that it comprises, within a same insulating casing, a control unit consisting of at least one electromagnet coil, the tubular core of which constitutes a part of the magnetic circuit of the relay, and a moving system which is coaxial with said core and which is adapted to move between two positions respectively known as the "rest" position and the "working" position, said moving system being attracted to its working position only when a current having predetermined characteristics flows through said coil; a switch unit so designed that the displacements of the moving portion are associated with those of the moving system of the control unit; and bearing means adapted to cooperate with said moving system in the "rest" position of said system, the position of said bearing means being adjustable from the exterior of the insulating casing.

In the application of the relay in accordance with the invention to the starting circuit of a single-phase motor, the relay switch is mounted in the supply circuit of the auxiliary winding of the motor and connected in series with said winding.

The invention also comprises within its scope the characteristic features which will be described hereinafter, reference being made to the accompanying drawings which show two forms of embodiment of said relay.

In these drawings:

FIG. 1 is a partial front view in axial cross-section of a first form of embodiment of the relay in accordance with the invention.

FIG. 2 is a view looking on the underface of the insulating plate which is shown in FIG. 1.

FIG. 3 is a left-hand sectional view of FIG. 2 taken along the line III—III.

FIG. 4 is a sectional view of FIG. 2 taken along the line IV—IV.

FIGS. 5 and 6 are respectively a front view and a plan view of the guide cup which is shown in FIG. 4.

FIG. 7 is an overhead view of the moving contact-holder which is shown in FIG. 4.

FIGS. 8 and 9 are respectively axial cross-section and plan views of a second form of embodiment of the relay in accordance with the invention.

FIGS. 10 and 11 are circuit diagrams of the relay as employed for the purpose of starting single-phase capacitor-start motors at supply voltages of, respectively, 110 and 220 volts.

The relay in accordance with the invention as represented in the accompanying drawings will be described hereinafter in its application to the starting of single-phase motors. It will remain wholly apparent, however, that the relay is suitable for use in all cases in which it is necessary to make or to interrupt a circuit as a function of the increase or decrease either in voltage or current intensity within the relay coil.

The relay which is illustrated as a first form of embodiment of the invention in FIGS. 1 to 7 consists in particular of a control unit, a switch unit and bearing means for the moving system of the control unit.

The control unit essentially comprises:

An electromagnet coil 1 which is intended to be supplied by the rising voltage induced in the terminals of the auxiliary winding of the motor when the speed of the rotor of this latter increases during starting;

A magnetic circuit made up of a machined tubular core 2 of soft iron, at the center of which is formed a bore which is intended to provide a passageway for the moving system controlling the relay switch unit, a cut-out washer 3, also of soft iron, in which the core is inset (said washer 3 being pierced with a hole suitably disposed for the lead-out connections of the coil 1) and a yoke 4 in which the washer 3 is inset and which is provided on the free side of the core with a bore 5 having a diameter which is slightly larger than the diameter of the core 2;

A moving system for the purpose of controlling the relay switch and consisting of an insulator pin 6 (as shown in FIG. 1) and a moving armature consisting of a soft iron washer 8.

The guiding of the pin 6 within the bore of the core 2 is effected by means of two cylindrical bearing surfaces of said bore, the bearing surface which has the larger diameter forming a housing in which is held a coil spring 7 for the purpose of normally maintaining the pin 6 at the top position thereof. That end of said pin 6 which supports the moving armature consists, as stated earlier, of the cut-out soft-iron washer 8. In the rest position, said washer 8 is urged upwards by the spring 7 which applies a force on the pin 6 so as to come into abutting contact with the extremity of a hollow screw 9. The screw 9 provides a means of regulating the distance between the washer 8 and the extremity of the core 2 from the exterior of the insulating casing 10 containing said control unit which, by virtue of this arrangement, permits a substantial leakage flux between the bore 5 of the yoke 4 and the extremity of the core 2.

In the case of low supply voltages, the position-setting of the armature 8 in the "rest" position is such that said armature is located outside the flux field which passes out of the core 2. When the voltage rises, the flux field reaches the washer 8 and this latter is attracted and drawn into contact with the core 2.

By means of this arrangement in accordance with the invention, there is practically no further leakage flux when the moving armature 8 is in the "working" position, that is to say when said armature is in contact with the core 2, thus reducing the armature release voltage to a very low value, which is particularly suitable for this type of relay.

The regulating screw 9 makes it possible, by moving the washer 8 either nearer to or away from the core 2, either to increase or reduce the armature-actuation voltage and consequently to obtain an optimum setting of the relay operating voltage, therefore of the speed which is chosen for the purpose of disconnecting the motor starting capacitor from the circuit.

There is forcibly fitted on the rear extremity of the core 2 a member 11 which is intended for a number of different purposes: when said member is connected to the electric circuit, it serves both as a current conductor and as a support, thus permitting fixing the relay on one of the motor terminals. In addition, said member 11 carries, by means of two rivets 12′, an insulating plate 12 on which are mounted all the electrical contact accessories. As all the accessories are assembled on the plate 12 by means of rivets, for example, provision is made between the plate 12 and the support 11 for a thin insulating washer 42 which ensures that the members subjected to voltages are insulated against ground (earth).

Provision is made within a second casing 13 for a chamber 14 in which is disposed the relay switch unit. This complementary casing 14 is preferably secured to the casing 10 by means of two flanges, the assembly being effected, for example, by means of two tubular rivets 15. The switch unit which is placed within the chamber 14 is disposed in such manner as to be controlled by the insulator pin 6 (as shown in FIG. 1) which is provided as mentioned earlier in the moving system which operates the contacts of said switch unit. Said contacts can be either opening contacts, closure contacts or even opening and closure contacts.

There now follows a description in connection with the relay switch unit in a form of embodiment of the "opening contact" type, again in the example of application of the relay to the starting circuit of a single-phase capacitor-start motor. The aforesaid switch unit comprises two supports 16 which are mounted on the insulating plate 12 and secured thereto by means of tubular rivets 12′, said supports being fitted with silver contact points 18. Said supports 16 extend to the outside of casing 13 and can each be provided with a fork-shaped portion 17 (as shown in FIG. 3) for the purpose of inserting and soldering therein a lead-wire or cable, but they can also be designed to accommodate detachable connectors of the flexible clamp type. The silver contact points which are fitted at 18 constitute the stationary portion of the opening contact.

One of the two lead-wires which are brought out from the coil 1 and passed through the plate 12 through an opening 19 formed in this latter is soldered to a force-fitted terminal connector 20, the free end of which is either joined to the connecting wire by soldering or fitted with a detachable connector of the flexible clamp type. The other lead-wire is soldered at 21 when the support 11 is intended to be isolated from the electric circuit. In the case in which the support 11 is intended to be employed as a conductor, provision is made for a connecting strip 22 (shown in chain-dotted lines in FIG. 2) which serves to provide an electrical connection between one of the two contact-point mounting-plates 16 and the support 11, and the lead-out connection from the coil which would otherwise have been soldered at 21 is in this case soldered at 23 onto said connecting strip 22. One of the two contact-point supports can be cut off at 24, as shown in chain-dotted lines in FIG. 2.

The switch unit also comprises a support 25 for the moving contact which is assembled, for example, by riveting on the insulating plate 12, said support being constituted by the two columns of a U-shaped member; one column 26 (as shown in FIG. 4) performs the function of a bearing member on which is pivotally mounted the moving contact 28 whereas the other column 27 is employed for the purpose of orienting the pivotally mounted moving contact 28, as well as for the purpose of anchoring and centering a compression spring 33 around a small annular projection 32. A moving contact-holder 36 carries the two silver contact points 29 which bear on the two points 18 of the stationary contacts. There is formed in said contact-holder a rectangular opening 30 about which the annular enlargement 32 is circumscribed, said opening being designed to permit the guiding of the member 25 along the column 27, the articulation of the contact-holder 28 on the column 26 being carried into effect by means of a cupped center-plate 31 formed by a die-stamped portion of said support 28.

A die-stamped cup 34 (as shown in FIGS. 5 and 6) serves to center the spring 33 on the column 27, the rapid anchoring thereof being effected by means of a cruciform opening 35 and by a suitably cut-out portion of the head of column 27 (as shown in FIGS. 3 and 4).

The cup 34 is of sufficient depth to ensure that, after this latter has been fitted in position, the column 26 cannot allow the cupped center-plate 31 to be dislodged either as a result of impact or as a result of any test which it may undergo in the course of utilization. When the assembly is mounted, the bearing point of the pin 6 is located approximately at 36 (as shown in FIG. 7).

The second form of embodiment of the relay in accordance with the invention as represented in FIGS. 8 and 9, satisfies requirements insofar as it provides for retaining a preliminary calibration when the final positioning of the relay is not the same as the position in which the calibration had initially been effected (this being especially so in the case where the relay is in a position which has been displaced through 180° about the horizontal plane relatively to the position shown in FIG. 1 or FIG. 8).

In this second form of embodiment, there is formed within the casing 10 a space which permits adding weights 40 for the purpose of balancing the moving system of the relay. In this case, the relay comprises a washer 37 which is provided as a result of cutting out and cambering with two flaps 38, there being formed in each flap two holes in which are pivotally mounted the two pivot-pins 39 of the symmetrical balance weights 40. Each weight has a metallic finger 41 which is applied against the moving armature 8. Each metallic finger 41 is coupled by magnetization to the moving armature 8 and accordingly follows the movements of this latter while producing the pivotal motion of its balance weight.

Irrespective of the positioning of the relay, the balance weight or weights serve to compensate for accelerating forces acting on the moving system, and the relay energization voltage or current intensity remains independent of the direction of displacement of the moving system.

The relay in accordance with the invention as hereinabove described in its application to the starting of capacitor-start single-phase motors, is placed in the supply circuit of a motor of this type as shown in FIG. 10 and FIG. 11, in which the supply voltages are respectively 110 volts and 220 volts.

In these figures, there has been shown at A the starting capacitor, at B and C respectively the switch assembly and the relay coil, at D the auxiliary winding of the motor and at E the main windings of said motor.

It can be mentioned by way of example that in the relay in accordance with the invention, the energization voltage or energization current intensity (the coil being either series-wound or shunt-wound at will) is approximately four times the releasing voltage or releasing current intensity, while in steady-state operation, the normal operating voltage or current intensity is approximately three times the releasing voltage or current intensity.

The relay as hereinabove described in its two forms of embodiment can also be utilized as a fault voltage relay (that is to say as a ground or earth relay).

In this third form of embodiment (which has not been illustrated in the drawings) there is incorporated with the switch unit a flexible blade which is intended to maintain the moving contact support in the "opening" position when said support has been brought into this position as a result of energization of the coil.

There is associated with said maintaining blade a manual release knob (of a conventional spring-loaded pushbutton type) which is intended to thrust back the flexible blade and consequently to free the moving contact support.

The contacts which are disposed in this case on the moving support can be either of the single-pole type for insertion in the protection circuit of a contactor or else of the two-pole type for the purpose of effecting the direct interruption of the operating current.

It will be readily apparent that the invention is not limited to the forms of embodiment which have been described and illustrated.

It will naturally be possible to have recourse to other modes and other forms of embodiment without thereby departing either from the scope or the spirit of the invention.

In particular:

The casing can have a parallelipipedal shape and can be provided with socket outlets which are arranged with particular regard to the application which is contemplated;

In the case of the starting of a single-phase motor, the voltage supply to the electromagnet of the relay can be taken as a lumped voltage between the extremity of the auxiliary winding and one phase conductor of the supply;

A rectified voltage can also be employed for the supply to the relay electromagnet;

In the case of special applications, the electromagnet relay can be designed for separate excitation and need have no common point with the contacts;

Finally the contacts can be either of the opening type—as shown in the figures—or of the closure type, or even of the opening and closure type.

What I claim is:

1. A magnetic leak relay comprising: an insulating casing; an electromagnet in said casing and comprising a coil having a tubular core and a yoke around said coil, said tubular core having a circular end face and said yoke including a single radial end wall adjacent but axially outwardly of said end face and provided with a circular opening slightly larger than said end face and concentric thereto whereby the periphery of said opening and said end face define an air gap in the flux path of said electromagnet; an actuator axially slidable in said core and having a ferromagnetic armature at one end thereof movable toward and from said end face of said core and into said gap; said armature being a substantially flat disc of a size to enter said gap and substantially completely fill the same and engage said end face; switch means operable by axial movement of said actuator; means urging said actuator in an axial direction to move said armature outwardly away from said end face of said core to a position axially outwardly of all portions of said end wall and substantially outside the principal flux field of said electromagnet, whereby low current in said coil releases said armature to move outwardly and whereby a materially higher current is necessary to draw said armature inwardly; and stop means carried by said casing for limiting the outward movement of said armature, said stop means being axially adjustable, from outside said casing whereby to regulate the outer position of said armature and thereby predetermine the magnitude of current in said coil necessary to draw said armature inwardly into said gap.

2. A magnetic leak relay comprising: an insulating casing; an electromagnet in said casing and comprising a coil having a tubular core and a yoke around said coil, one end of said core being spaced from said yoke to define a gap in the flux path of said electromagnet; an actuator axially slidable in said core and having a ferromagnetic armature at one end thereof movable toward and from said one end of said core and into said gap; switch means operable by axial movement of said actuator; means urging said actuator in an axial direction to move said armature outwardly away from said one end of said core; stop means carried by said casing for limiting the outward movement of said armature, said stop means being axially adjustable, from outside said casing whereby to regulate the outer position of said armature and thereby predetermine the magnitude of current in said coil necessary to draw said armature inwardly to said core; weight means pivotally mounted in said casing on one side of a transverse axis; and a ferromagnetic finger extending from said weight means on the other side of said transverse axis and bearing against the outer side of said armature.

3. A magnetic leak relay comprising: an insulating casing; an electromagnet in said casing and comprising a coil having a tubular core and a yoke around said coil, one end of said core being spaced from said yoke to define a gap in the flux path of said electromagnet; an actuator axially slidable in said core and having a ferromagnetic armature at one end thereof movable toward and from said one end of said core and into said gap; switch means operable by axial movement of said actuator; means urging said actuator in an axial direction to move said armature outwardly away from said one end of said core; stop means carried by said casing for limiting the outward movement of said armature, said stop means being axially adjustable, from outside said casing whereby to regulate the outer position of said armature and thereby predetermine the magnitude of curernt in said coil necessary to draw said armature inwardly to said core; said switch means including a flexible means for holding said switch open after opening thereof by said electromagnet; and pushbutton means for releasing said flexible means to permit said switch means to close.

References Cited by the Examiner

UNITED STATES PATENTS

| | | | |
|---|---|---|---|
| 1,686,643 | 10/1928 | Schuster | 200—166 |
| 2,379,772 | 7/1945 | Wellman | 200—111 |
| 2,391,277 | 12/1945 | Stapleton | 200—111 X |
| 2,476,794 | 7/1949 | Austin | 200—87 X |
| 2,539,547 | 1/1951 | Mossman et al. | 200—87 X |
| 2,992,304 | 7/1961 | Andrews | 200—104 X |

BERNARD A. GILHEANY, *Primary Examiner.*

ROBERT K. SCHAEFER, *Examiner.*

J. J. BAKER, *Assistant Examiner.*